United States Patent
Biskeborn et al.

(10) Patent No.: US 10,062,397 B2
(45) Date of Patent: Aug. 28, 2018

(54) TAPE HEAD WITH STEP-LIKE CROSS-SECTIONAL PROFILE

(71) Applicant: International Business Machines Corporation, Armonk, NY (US)

(72) Inventors: Robert G. Biskeborn, San Jose, CA (US); Johan Engelen, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/042,364

(22) Filed: Feb. 12, 2016

(65) Prior Publication Data

US 2017/0236535 A1     Aug. 17, 2017

(51) Int. Cl.
*G11B 5/187*    (2006.01)
*G11B 5/008*    (2006.01)
*G11B 5/29*    (2006.01)

(52) U.S. Cl.
CPC ........ *G11B 5/1871* (2013.01); *G11B 5/00813* (2013.01); *G11B 5/29* (2013.01)

(58) Field of Classification Search
CPC ...... G11B 5/00813; G11B 5/1871; G11B 5/29
USPC .............. 360/121, 122, 231, 241.1
See application file for complete search history.

(56) References Cited

U.S. PATENT DOCUMENTS

| | | | |
|---|---|---|---|
| 5,652,015 A | 7/1997 | Aboaf et al. | |
| 6,021,013 A | 2/2000 | Albrecht et al. | |
| 6,122,147 A * | 9/2000 | Fahimi | G11B 5/1871 360/130.21 |
| 6,947,256 B2 * | 9/2005 | Biskeborn | G11B 5/00813 360/122 |
| 8,014,100 B2 | 9/2011 | Biskeborn et al. | |
| 8,310,783 B2 * | 11/2012 | Kawakami | G11B 5/00821 360/122 |
| 2008/0019049 A1 * | 1/2008 | Deshpande | G11B 5/105 360/231 |
| 2013/0148237 A1 | 6/2013 | Biskeborn et al. | |
| 2014/0362473 A1 | 12/2014 | Biskeborn et al. | |
| 2015/0364154 A1 * | 12/2015 | Holmberg | G11B 5/00826 360/90 |

(Continued)

FOREIGN PATENT DOCUMENTS

WO    2014149055 A1    9/2014

*Primary Examiner* — Jefferson Evans
(74) *Attorney, Agent, or Firm* — Harrington & Smith

(57) ABSTRACT

A tape head is provided for reading and/or writing to a magnetic tape. The tape head including a step-like cross-sectional profile, so as to exhibit a riser between two treads, the latter respectively formed by a tape-bearing surface and a recessed surface, wherein: the tape-bearing surface is essentially flat and configured to contact a magnetic tape, and comprises at least one transducer, the latter being a read or a write element, configured to read or write to the magnetic tape, respectively; and the recessed surface is recessed from the tape-bearing surface by a distance h corresponding to a height of the riser, a width w of the recessed surface along a direction parallel to a longitudinal direction z of circulation of the tape being such that a ratio h/w is at least of 0.01. Related tape head apparatuses for recording or reproducing multi-track tapes are also provided.

16 Claims, 3 Drawing Sheets

(56) References Cited

U.S. PATENT DOCUMENTS

2016/0055867 A1* 2/2016 Engelen ................ G11B 5/255
                                                                360/125.72
2016/0111120 A1* 4/2016 Engelen ................ G11B 5/255
                                                                 360/231

* cited by examiner

TAPE HEAD WITH STEP-LIKE CROSS-SECTIONAL PROFILE

BACKGROUND

The invention relates in general to the field of tape head and apparatuses for reading and/or writing to a magnetic tape. In particular, it is directed to tape heads designed so as to minimize the portion of the tape-bearing surface that comes into contact with the magnetic tape, in order to reduce friction and wear.

Various data storage media or recording media such as magnetic tape, magnetic disks, optical tape, optical disks, holographic disks or cards, and the like are known which allow for storage and retrieval of data. In particular, in magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel depending. Transducer (read/write) heads are positioned relative to the data tracks to read/write data along the tracks. To this aim, a tape drive head must locate each data track and accurately follow its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo reader reads a servo pattern, which is then interpreted by a servo channel into a position error signal (PES). The latter is then used to adjust the distance of the servo head relative to the servo pattern and thereby ensure a proper positioning of the transducers with respect to the set of data tracks.

Essentially two technologies have been developed for timing-based servo patterns. The first one makes use of surface thin film servo writers, as discussed in, e.g., U.S. Pat. No. 6,021,013. The second technology relates to so-called "pure thin film planar servo writers", see, e.g., U.S. Pat. No. 5,652,015, U.S. Pat. No. 6,947,256, and U.S. Pat. No. 8,014,100. Pure thin film planar servo writers potentially have several advantages over surface thin film servo writers, such as improved servo format quality, increased servo formatting speed, increased servo pattern design flexibility and reduced fabrication costs.

SUMMARY

According to an embodiment, a tape head is provided. The tape head comprising a step-like cross-sectional profile, so as to exhibit a riser between two treads, the latter respectively formed by a tape-bearing surface and a recessed surface. The tape-bearing surface is essentially flat and configured to contact a magnetic tape, and comprises at least one transducer, the latter being a read or a write element, configured to read or write to the magnetic tape, respectively. The recessed surface is recessed from the tape-bearing surface by a distance h corresponding to a height of the riser, a width w of the recessed surface along a direction parallel to a longitudinal direction z of circulation of the tape being such that a ratio h/w is at least of 0.01.

The invention can also be embodied as a tape head apparatus for recording and/or reproducing multi-track tapes, which apparatus comprises a tape head as described above.

Devices and apparatuses embodying the present invention will now be described, by way of non-limiting examples, and in reference to the accompanying drawings.

BRIEF DESCRIPTION OF SEVERAL VIEWS OF THE DRAWINGS

For comparison purposes.

Figure 1:
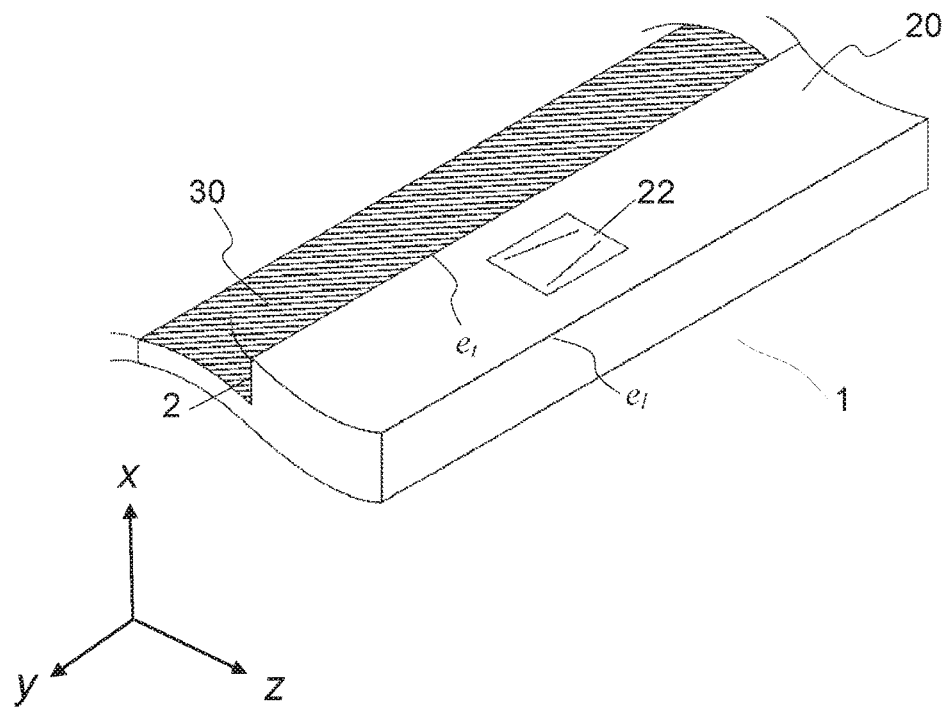
FIG. 1 is a 3D view of a planar tape head (a servo writer), according to embodiments.

The accompanying drawings show simplified representations of devices or parts thereof, as involved in embodiments. Technical features depicted in the drawings are not to scale. In particular, the scales assumed for axes x and z differ. Similar or functionally similar elements in the figures have been allocated the same numeral references, unless otherwise indicated.

DETAILED DESCRIPTION OF EMBODIMENTS OF THE INVENTION

As it can be realized, the second technology evoked earlier in the background ("pure thin film planar servo writers") may substantially suffer from friction and wear. Friction is problematic as it results in velocity variations during servo formatting that cause written-in velocity noise and degrade servo performance. Wear of the servo writer is also problematic as it limits the useful lifetime of a servo write head.

Having realized these potential issues, present inventors have developed solutions, which can notably find applications in pure thin film planar servo writers. However, and the one skilled in the art may appreciate, the present solutions may potentially apply to any type of tape head.

Tape heads according to embodiments of the invention are now described in reference to FIGS. 1-3, and 5-7. Such tape heads are denoted by numeral references 1, 2, 3 in the accompanying drawings.

Figure 2:
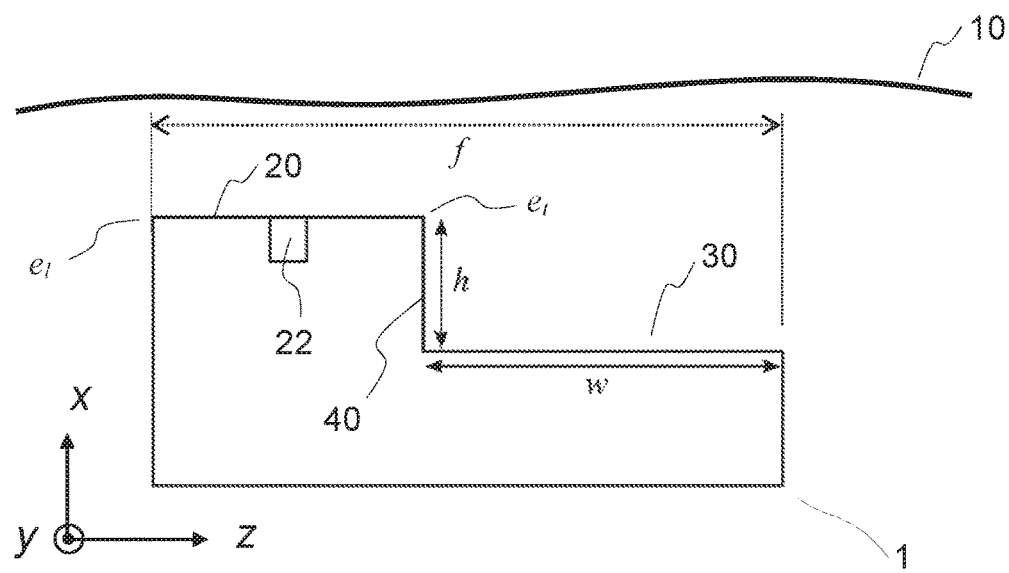
FIG. 2 is a 2D cross-sectional view of a tape head, such as depicted in FIG. 1.
Figure 3:
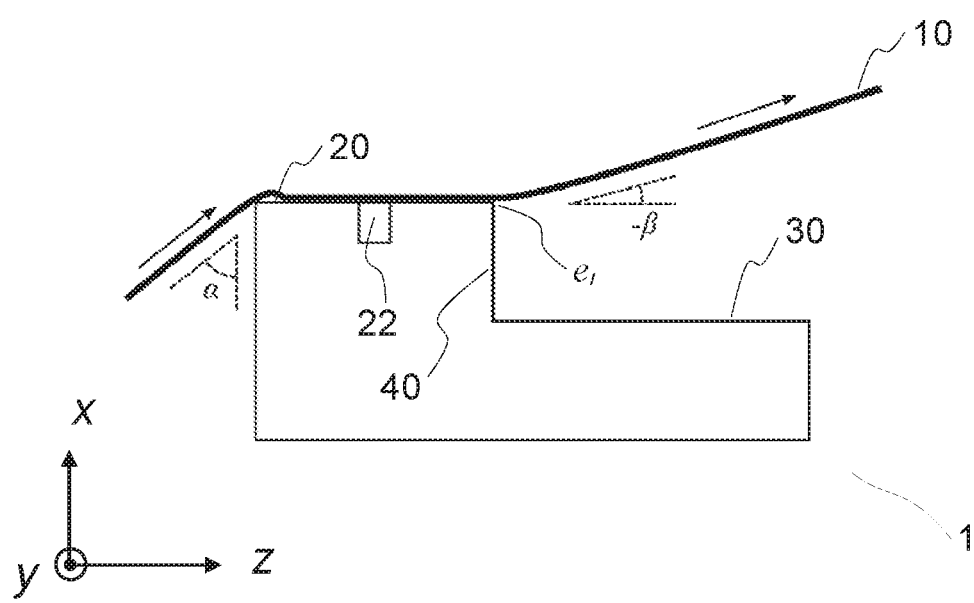
FIG. 3 illustrates a preferably intended operation of the tape head of FIG. 2, involving a positive leading wrap angle α and a negative trailing wrap angle β.

Most generally, a tape head according to embodiments shall be designed for reading and/or writing to a magnetic tape 10, via the tape-bearing surface 20, the latter meant to come into contact with the tape 10. As illustrated in FIGS. 1-3, such a tape head 1 has a step-like cross-sectional profile in the plane (x, z), so as to exhibit two treads 20, 30, each extending essentially parallel to the plane (y, z), with a riser 40 in-between, the riser extending essentially parallel to the plane (x, y). The threads are respectively formed by a tape-bearing surface 20 and a recessed surface 30, the latter located on, e.g., the side of the trailing edge et of the tape-bearing surface 20, as illustrated in FIG. 2.

The tape-bearing surface 20 is essentially flat. It is generally configured to contact the tape 10, in operation. The surface 20 comprises at least one transducer 22, which may be a read or a write element, i.e., an element configured in the tape head to respectively read or write to the magnetic tape 10, in operation. Still, the tape-bearing surface 20 shall typically include several transducers. The tape-bearing surface 20 is preferably planar, i.e., it comprises one or more in-plane transducers 22, embedded in the surface 20 so as to be essentially level therewith.

Providing a step-like structure allows to effectively decrease the area of the tape head that comes into contact with the tape 10, as only the area 20 touches the tape 10, in operation. Indeed, the total footprint f of the head (see FIGS. 2, 5, 7) cannot be indefinitely reduced, owing to the wiring and other parts needed in the head, be it to electrically connect the transducers 22 to other components of a tape head apparatus (not shown), as known per se. However, it possible to trim the top portion of the tape head, e.g., by etching portions surrounding the intended contact surface 20. This way, one obtains a step-like structure (whereby only the surface 20 touches the tape 10), which makes it possible to reduce the effective contact area and, hence, to reduce friction and wear. The minimal surface area 20 that can be achieved (to create a step-like profile) depends on the type and arrangement of transducers 22 utilized.

Because of the riser 40, the recessed surface 30 is recessed from the tape-bearing surface 20, by a distance h that corresponds to the height of the riser 40, i.e., along x. The riser 40 and, more generally, the step-like structure 20-40-30 can be obtained by etching into the portion 30 (and more generally all the portions 30, 35 surrounding the area 20, see FIGS. 5-7).

However, and as it can be realized, the surrounding portions 30, 35 should not be etched too deep, else the wirings (needed to connect the transducers 22) and other sensitive parts possibly contained in the head may be affected. Thus, the distance h should, in practice, be as small as possible, to avoid damaging the tape head and to facilitate fabrication.

Still, as present inventors have realized, the distance h cannot be too small either with respect to the width w of the recessed surface 30 (w extends along a direction parallel to the longitudinal direction z of circulation of the tape 10). Namely, and as the present inventors have concluded from extended sets of experiments and simulations, the ratio h/w must be at least of 0.01 (subject to an accuracy of 0.002), to avoid that the tape 10 is pushed against the recessed area 30 during operation. For example, for a recessed width w of 500 micrometer, the step height h must be at least 5 micrometer.

Figure 4:
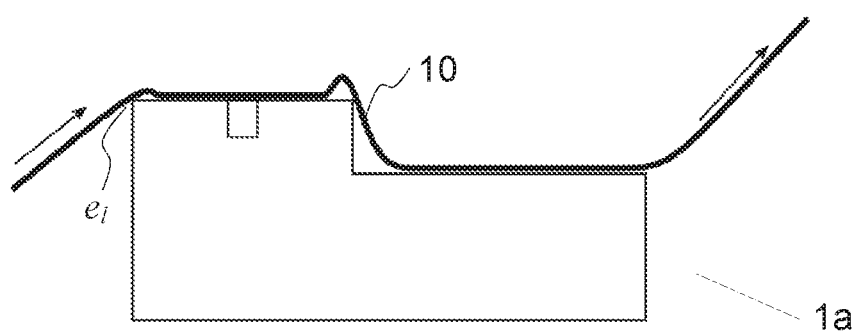
FIG. 4 shows a 2D cross-sectional view of an unsuitably dimensioned tape head (not according to embodiments), causing the tape to touch down on the recessed area of the tape head.

In this respect, FIG. 3 illustrates a typical intended operation of the tape 10, whereas an improper dimensioning of the h/w ratio would cause the tape 10 to touch the recessed area, as illustrated in FIG. 4 showing an improperly dimensioned device 1a (recall that, in FIGS. 1-7, the scales along axes x and z differ, for the sake of depiction).

According to experiments and simulations (the latter using finite elements methods) conducted by the inventors, a critical, threshold value for the ratio h/w is 0.01. I.e., this ratio must be at least equal to or larger than 0.01 for the recessed surface 30 not to contact the tape 10, in operation, owing to the typical profiles of differences of pressures acting on each side of the tapes as they occur for typical tape speeds and tape materials. I.e., this ratio was found to produce the desired effect over the ranges of typical parameters used. Interestingly, this threshold ratio works in practice quite independently of variations of usual materials for the tape and the tape-bearing surfaces, and usual tape width and speeds. I.e., provided that the tape-bearing surface is flat (as is the case with planar tape heads), the main, critical parameter, as identified by the present inventor, is the ratio h/w.

In embodiments such as depicted in FIGS. 1-3, and 5-7, the tape heads 1, 2, 3 are designed so as to exhibit at least one recessed surface 30, which is located on the side of the trailing edge et of the tape-bearing surface 20. However, a second recessed surface 35 may further be provided, opposite to the first recessed surface 30 with respect to the surface 20, as discussed later in reference to FIGS. 5-7. More generally, present tape heads 1-3 may be provided with more sophisticated stair-like structures, provided that the above ratio is respected (at least for the top steps).

As evoked above, the distance h is ideally as small as possible and, in practice, preferably between 1 and 10 microns, to ease the etching process and ensure that it will not damage parts in the lower compartment of the head. More preferably, the distance h shall be between 3 and 7 microns. Suitable widths w for the recessed surface 30 shall accordingly be between (at most) 100 and 1000 microns, and more preferably between (at most) 300 and 700 microns, owing to the above constraint on the ratio h/w.

A head was for instance successfully tested, for which the distance h was equal to 6 microns The corresponding width w of the recessed surface 30 was 600 microns.

Present tape heads 1, 2, 3 may have one or more recessed surfaces 30, 35, i.e., this including the first recessed surface 30. It should be kept in mind that the surfaces 20, 30, 35 typically are of a same order of magnitude, i.e., the surfaces 30, 35 are substantial and cannot be compared to the mere result of defects in the fabrication. Preferably, the total footprint f of the tape head is essentially equal to the sum of said tape-bearing surface 20 and said one or more recessed surfaces 30, 35, though only the surface 20 comes into contact with the tape 10. The footprint is measured in a plane (y, z) parallel to the surface 20, which plane (y, z) comprises the longitudinal direction z of circulation of the tape 10.

As described herein, the recessed surface is typically located on the trailing edge of the tape-bearing surface. However, in embodiments, two recessed surfaces are provided, on each side of the tape-bearing surface.

Figure 5:
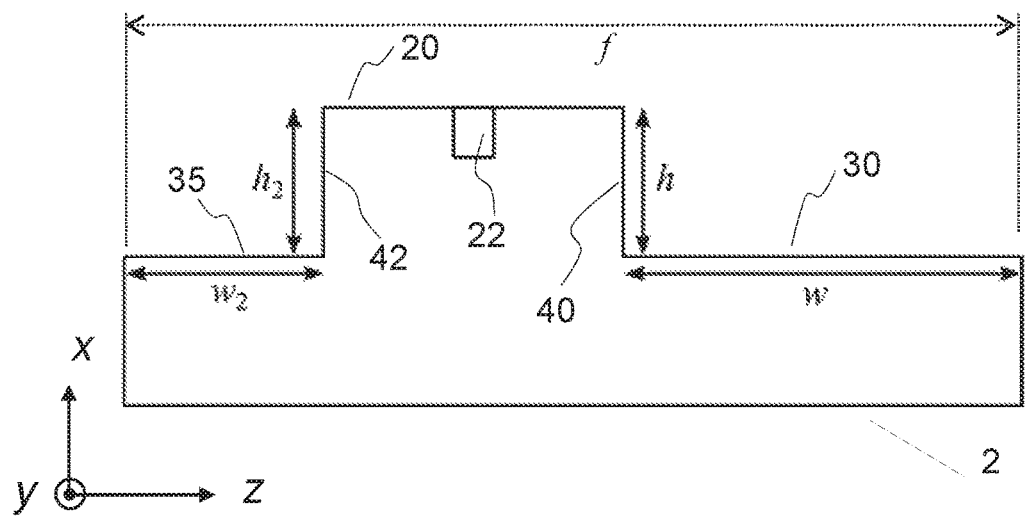
FIG. 5 is a 2D cross-sectional view of a tape head having two recessed areas, according to other embodiments.
Figure 6:
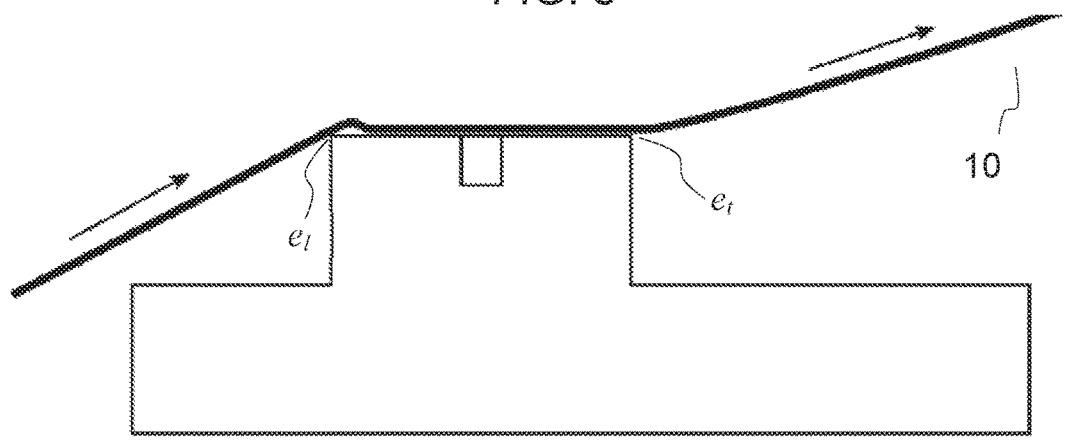
FIG. 6 illustrates a preferably intended operation of the tape head of FIG. 5, involving a positive leading wrap angle α and a negative trailing wrap angle β.
Figure 7:
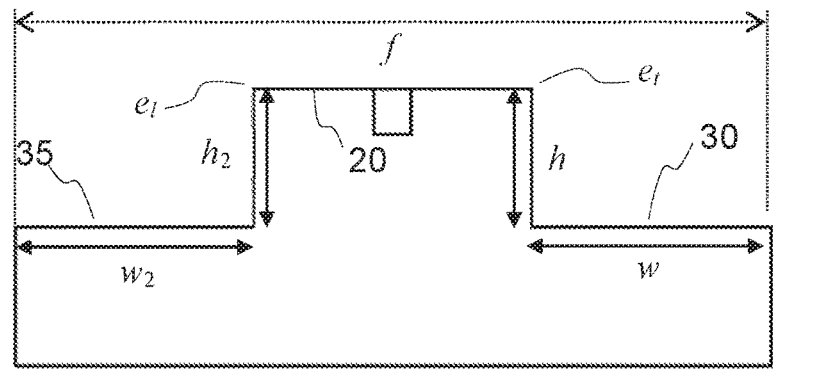
FIG. 7 is a 2D cross-sectional view of a symmetric tape head with two recessed areas, according to embodiments.

Referring now more specifically to FIGS. 5-7, present tape heads 2, 3 may, in embodiments, exhibit two recessed surfaces 30, 35, i.e., a first recessed surface 30 on the trailing edge et of the tape-bearing surface 20 (as in the embodiment of FIGS. 1-3), as well as a second recessed surface 35, located on the leading edge $e_1$ of the tape-bearing surface 20.

As seen in FIG. 5, the second recessed 35 surface is recessed from the tape-bearing surface 20 by a distance $h_2$, corresponding to the height of the riser 42 provided between the tape-bearing surface 20 and the second recessed surface 35. The latter has a width $w_2$ along the direction z. In addition, the ratio $h_2/w_2$ should be at least of 0.01, to prevent the tape (or at least substantially lower the chance for it) to contact the second recessed surface 35, in operation.

Again, the distance $h_2$ shall advantageously be between 1 and 10 microns. The fabrication of the head will be greatly facilitated if the distances h and $h_2$ are chosen equal.

A preferred intended operation of present tape heads is with a positive leading wrap angle α and a negative trailing wrap angle β, and unidirectionally. Thus, present heads 1, 2, 3 are preferably designed to allow such operation, as illustrated in FIGS. 3 and 6, where α is (approximately) equal to 1° and β is (approximately) equal to −1° (it being reminded the different scales assumed on axes x and z).

Yet, as evoked above in reference to FIG. 5, the invention generalizes to recessed portions downstream and upstream. For bidirectional operation, the wrap angles α and β shall most likely be equal (symmetric wrap), in which case the lower bound on the ratios h/w and $h_2/w_2$ are further determined by the desired wrap angles. For instance, in the embodiment of FIG. 7, the recessed surface 30, the riser 40, the tape-bearing surface 20, the second riser 42 and the second recessed surface 35 are relatively configured so as for the tape head 3 to have a cross-sectional profile in the plane (x, z) that is essentially symmetric with respect to the plane (x, y). In variants, asymmetric profiles are desired, to further tune the wrap angles.

A tape head 1, 2, 3 as described herein is preferably a planar servo write head, i.e., a planar head comprising at least one, in-plane transducer (writer) 22, whose top poles are essentially level (i.e., front-flush) with the tape bearing surface 20. Present tape heads 1-3 can notably be used in tape head apparatuses for recording and/or reproducing multi-track tapes. The present invention can accordingly be embodied as such an apparatus.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A tape head, adapted for reading and/or writing to a magnetic tape, the tape head having a step-like cross-sectional profile, so as to exhibit a riser between two treads, the latter respectively formed by a tape-bearing surface and a recessed surface,
wherein:
   the tape-bearing surface is essentially flat and configured to contact the tape, and comprises at least one transducer, the latter being a read or a write element, configured to read or write to the magnetic tape, respectively; and
   the recessed surface is recessed from the tape-bearing surface by a distance h corresponding to a height of the riser, a width w of the recessed surface along a direction parallel to a longitudinal direction z of circulation of the tape being such that a ratio h/w is at least of 0.01 such that the tape does not contact the recessed surface when the tape head is in operation, and wherein the distance h is between 1 and 10 microns and the width w is less than 500 microns;
   the tape head exhibits one or more recessed surfaces, the one or more recessed surfaces comprising said recessed surface, wherein a footprint of the tape head in a plane parallel to said tape-bearing surface and said one or more recessed surfaces is essentially equal to the sum of said tape-bearing surface and said one or more recessed surfaces.

2. The tape head of claim 1, wherein
the recessed surface is located on a side of a trailing edge of the tape-bearing surface.

3. The tape head of claim 1, wherein
the distance h is between 3 and 7 microns.

4. The tape head of claim 3, wherein
the distance h is equal to 6 microns.

5. The tape head of claim 1, wherein
the tape head exhibits at least two recessed surfaces, the latter comprising:
   said recessed surface on a trailing edge of the tape-bearing surface; and
   a second recessed surface on a leading edge of the tape-bearing surface, the second recessed surface being recessed from the tape-bearing surface by a distance $h_2$, corresponding to a height of a second riser between said tape-bearing surface and the second recessed surface, the latter having a width $w_2$ along a direction parallel to a longitudinal direction z of circulation of the tape, such that a ratio $h_2/w_2$ is at least of 0.01.

6. The tape head of claim 5, wherein
each of the distances h and $h_2$ is between 1 and 10 microns.

7. The tape head of claim 6, wherein
the distances h and $h_2$ are equal.

8. The tape head of claim 5, wherein
said recessed surface, said riser, said tape-bearing surface, said second riser and said second recessed surface are relatively configured so as for the tape head to have a cross-sectional profile in a plane perpendicular to said tape-bearing surface and comprising said longitudinal direction z of circulation of the tape, which cross-sectional profile is essentially symmetric with respect to a plane perpendicular to said longitudinal direction z.

9. The tape head of claim 5, wherein
the tape head is a servo writer, said at least one transducer being a write element, configured to write to the magnetic tape.

10. A tape head apparatus for recording and/or reproducing multi-track tapes, wherein
the apparatus comprises the tape head of claim 9.

11. The tape head of claim 5, wherein
said at least two recessed surfaces and said tape-bearing surface are configured so as to allow a positive leading wrap angle α and a negative trailing wrap angle β.

12. The tape head of claim 11, wherein
the positive leading wrap angle α is of 1° and the negative trailing wrap angle β is of −1°.

13. The tape head of claim 1, wherein
the tape-bearing surface is a planar tape head, which comprises one or more in-plane transducers.

14. A tape head apparatus for recording or reproducing multi-track tapes, wherein
the apparatus comprises the tape head of claim 1.

15. The tape head of claim 1, wherein the width w of the recessed surface is greater than 100 microns.

16. The tape head of claim 15, wherein the width w is less than 400 microns.

\* \* \* \* \*